United States Patent
Sugawara

(10) Patent No.: US 11,709,832 B2
(45) Date of Patent: Jul. 25, 2023

(54) INFORMATION PROCESSING SYSTEM, INFORMATION PROCESSING DEVICE, AND NON-TRANSITORY COMPUTER-READABLE STORAGE MEDIUM

(71) Applicant: FUJITSU LIMITED, Kawasaki (JP)

(72) Inventor: Hisashi Sugawara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 17/162,935

(22) Filed: Jan. 29, 2021

(65) Prior Publication Data
US 2021/0303567 A1 Sep. 30, 2021

(30) Foreign Application Priority Data
Mar. 25, 2020 (JP) .................. 2020-054536

(51) Int. Cl.
*G06F 16/2453* (2019.01)
*G06F 16/2458* (2019.01)

(52) U.S. Cl.
CPC .... *G06F 16/24532* (2019.01); *G06F 16/2471* (2019.01)

(58) Field of Classification Search
CPC .......... G06F 16/24532; G06F 16/2471; G06F 16/24534
See application file for complete search history.

(56) References Cited

U.S. PATENT DOCUMENTS

| 6,269,365 B1 | 7/2001 | Kiyoki et al. |
| 11,159,338 B1 * | 10/2021 | Roche ..................... H04L 67/10 |
| 2007/0219959 A1 | 9/2007 | Kanemasa |
| 2009/0254774 A1 | 10/2009 | Chamdani et al. |

(Continued)

FOREIGN PATENT DOCUMENTS

| JP | H10-049409 A | 2/1998 |
| JP | 2007-257083 A | 10/2007 |

OTHER PUBLICATIONS

Extended European Search Report dated Jun. 24, 2021 for corresponding European Patent Application No. 21153715.4, 9 pages.

(Continued)

*Primary Examiner* — Cam Y T Truong
(74) *Attorney, Agent, or Firm* — Fujitsu Patent Center

(57) ABSTRACT

An information processing system includes a first information processing device configured to accept an input of a query to be processed, and a second information processing device configured to execute the query for each of a plurality of tasks in parallel. The first information processing device determines whether or not an external database server contains records targeted by the query, and transmit the query and a connection information for accessing the external database server to the second information processing device. The second information processing device connects to the external database server based on the connection information received from the first information processing device, acquires information indicating a storage status of the records targeted by the query among records stored in the external database server, and determines a processing target range for each of the plurality of tasks relevant to the records targeted by the query, based on the acquired information.

9 Claims, 20 Drawing Sheets

(56) References Cited

U.S. PATENT DOCUMENTS

| | | | | |
|---|---|---|---|---|
| 2014/0244728 A1* | 8/2014 | Endo | ............ | H04L 67/1031 |
| | | | | 709/203 |
| 2014/0310242 A1* | 10/2014 | Bakir | ............ | G06F 16/252 |
| | | | | 707/634 |
| 2014/0358934 A1* | 12/2014 | Hirose | ............ | G06F 16/2452 |
| | | | | 707/741 |
| 2017/0052829 A1* | 2/2017 | Noda | ............ | G06F 9/4881 |
| 2019/0147085 A1* | 5/2019 | Pal | ............ | G06F 16/24542 |
| | | | | 707/718 |
| 2019/0310983 A1 | 10/2019 | Kong et al. | | |
| 2021/0058444 A1* | 2/2021 | Kumar | ............ | H04L 67/1097 |

OTHER PUBLICATIONS

Eavis, Todd et al., "Sidera: A Cluster-Based Server for Online Analytical Processing", On the Move to Meaningful Internet Systems 2007:[LECTURE Notes in Computer Science], XP019083294, pp. 1453-1472, XP019083294, Nov. 30, 2007.

* cited by examiner

FIG. 17

| targetList | |
|---|---|
| rtable | •——▶ |
| jointree | |
| sortclause | |

| rtekind | RTE_RELATION |
|---|---|
| relid | 16001 |
| subquery | NULL |

FIG. 18

| EXTERNAL TABLE ID | EXTERNAL DB ID |
|---|---|
| 16001 | 21001 |
| 16002 | 21002 |
| ... | ... |

FIG. 19

| EXTERNAL DB ID | host | port | DB NAME | user | password |
|---|---|---|---|---|---|
| 21001 | 192.168.100.100 | 1234 | DB1 | user1 | AAAA |
| 21002 | 192.168.100.200 | 5678 | DB2 | user2 | BBBB |
| ... | ... | ... | ... | ... | ... |

FIG. 20

| EXTERNAL TABLE ID | host | port | DB NAME | user | password |
|---|---|---|---|---|---|
| 16001 | 192.168.100.100 | 1234 | DB1 | user1 | AAAA |

| ctid | COLUMN A | COLUMN B |
|---|---|---|
| (0,1) | 100 | TOKYO |
| (0,2) | 200 | OSAKA |
| ... | ... | ... |
| (100,100) | 999 | OKINAWA |

100

INFORMATION PROCESSING SYSTEM, INFORMATION PROCESSING DEVICE, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-54536, filed on Mar. 25, 2020, the entire contents of which are incorporated herein by reference.

FIELD

The embodiments discussed herein are related to an information processing system, an information processing device, and a non-transitory computer-readable storage medium.

BACKGROUND

For example, a business operator that provides a service to a user (hereinafter, also simply referred to as a business operator) constructs a business system necessary for providing the service. For example, the business operator constructs a business system that combines a plurality of types of databases for the purpose of utilizing big data.

When constructing a business system as described above, the business operator develops and maintains an application for each of the plurality of types of databases, for example. Therefore, in this case, the cost required for the development and the like of the business system is larger than the cost of other business systems.

Thus, when constructing a business system as described above, the business operator constructs a multi-model database using, for example, a database (hereinafter, also referred to as a management database) that manages the plurality of types of databases in an integrated manner. In more detail, the business operator constructs a multi-model database by, for example, performing external database virtualization in which each of the plurality of types of databases is deployed in an external database (an externally prepared database accessible from the management database).

With this configuration, the user is allowed to use data stored in the plurality of types of databases (hereinafter, also referred to as an external database) by accessing the management database. Therefore, in this case, the business operator may suppress the development cost and the like of the application for accessing the external database (for example, refer to Japanese Laid-open Patent Publication No. 2007-257083 and Japanese Laid-open Patent Publication No. 10-049409).

Japanese Laid-open Patent Publication No. 2007-257083 and Japanese Laid-open Patent Publication No. 10-049409 are disclosed as related art.

SUMMARY

According to an aspect of the embodiments, an apparatus includes an information processing system includes: a first information processing device configured to accept an input of a query to be processed; and a second information processing device configured to execute the query for each of a plurality of tasks in parallel. The first information processing device is further configured to: determine whether or not an external database server contains records targeted by the query, specify connection information for accessing the external database server when the external database server contains the records targeted by the query, transmit the query and the connection information to the second information processing device. The second information processing device is further configured to connect to the external database server based on the connection information received from the first information processing device, acquire information indicating a storage status of the records targeted by the query among records stored in the external database server, and determine a processing target range for each of the plurality of tasks relevant to the records targeted by the query, based on the acquired information indicating the storage status.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram explaining a specific example of an analysis result 131 for a query;

FIG. 18 is a diagram explaining a specific example of table information 132;

FIG. 19 is a diagram explaining a specific example of DB information 133;

FIG. 20 is a diagram explaining a specific example of connection information 134;

DESCRIPTION OF EMBODIMENTS

In the related art, even when the business system using the multi-model database is constructed as described above, the contained data is managed separately in the external databases. Therefore, in the business system, it is sometimes difficult to carry out performance optimization and the like, which are usually carried out in the database, and the external database is not allowed to be efficiently used in some cases.

Thus, in one aspect, an object of the present embodiments is to provide an information processing system, an information processing method, an information processing program, and an information processing device that enable efficient use of an external database.

[Configuration of Information Processing System]

Figure 1:
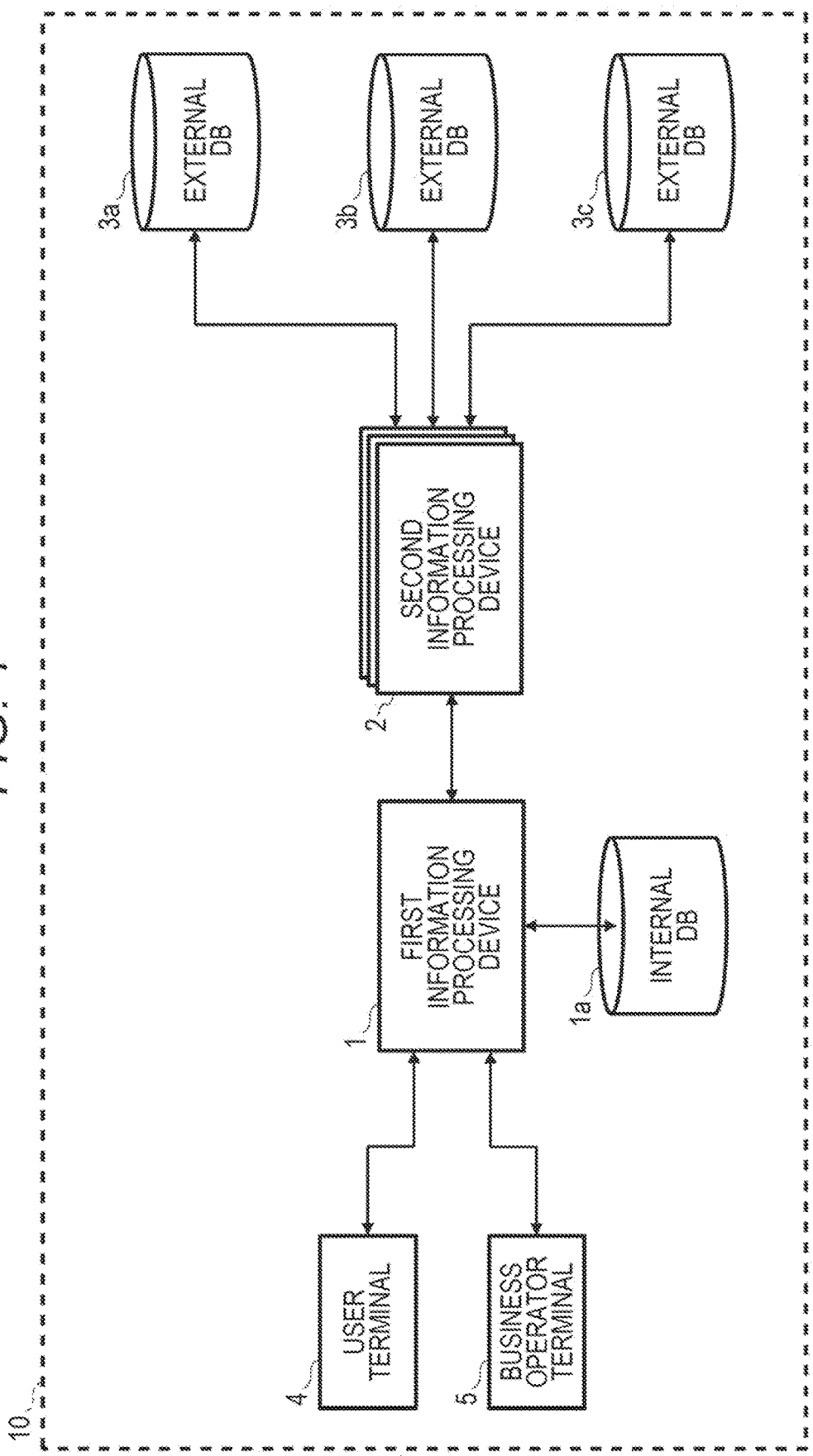
FIG. 1 is a diagram explaining a configuration of an information processing system 10.

First, a configuration of an information processing system 10 will be described. FIG. 1 is a diagram explaining a configuration of the information processing system 10.

The information processing system 10 illustrated in FIG. 1 includes an information processing device 1 (hereinafter, also referred to as a first information processing device) and an information processing device 2 (hereinafter, also referred to as a second information processing device). The information processing system 10 illustrated in FIG. 1 further includes a database server 3*a* (hereinafter, also referred to as an external DB 3*a*), a database server 3*b* (hereinafter, also referred to as an external DB 3*b*), and a database server 3*c* (hereinafter, also referred to as an external DB 3*c*). Moreover, the information processing system 10 includes a user terminal 4 in which a user makes inputs and the like of various kinds of information, and a business operator terminal 5 in which a business operator makes inputs and the like of various kinds of information. Hereinafter, the external DBs 3*a*, 3*b* and 3*c* are also collectively referred to as external DBs 3.

The information processing device 1 is, for example, a database server that includes a management database 1*a* (hereinafter, also referred to as an internal DB 1*a*). Furthermore, the information processing device 2 is, for example, a server group made up of a plurality of servers that function as parallel and distributed processing platforms.

The external DB 3 is a database server that includes a database in which data to be accessed by the user via the user terminal 4 is stored. For example, the external DBs 3 store data corresponding to data models different from each other. Additionally, the data stored in each of the external DBs 3 is, for example, log data transmitted from an Internet of Things (IoT) sensor, a document input by the user via the user terminal 4, and the like.

For example, when accepting the input of a query input by the user via the user terminal 4, the information processing device 1 determines whether or not the external DB 3 contains at least a part of records targeted by the accepted query. Then, when it is determined that the external DB 3 contains at least a part of the records targeted by the query, the information processing device 1 specifies connection information for accessing the determined external DB 3. Thereafter, the information processing device 1 transmits, for example, the query whose input has been accepted and the specified connection information to the information processing device 2.

Furthermore, the information processing device 1 determines, for example, whether or not the internal DB 1*a* contains at least a part of the records targeted by the accepted query. Then, when it is determined that the internal DB 1*a* contains at least a part of the records targeted by the query, the information processing device 1 executes the query using the records stored in the internal DB 1*a* as a target.

When receiving the query and the connection information from the information processing device 1, the information processing device 2 connects to the external DB 3 based on the received connection information, and acquires information indicating the storage status of the records targeted by the query, among records stored in the external DB 3. Then, the information processing device 2 designates the processing target range for each of a plurality of tasks relevant to the records targeted by the received query, based on the acquired information.

Thereafter, the information processing device 2 executes the query for each of tasks corresponding to the number of task divisions, using a record corresponding to the processing target range of each task as a target. For example, the plurality of servers constituting the information processing device 2 individually executes the query in parallel, using a record corresponding to the processing target range of a task assigned to each server as a target.

For example, when accepting a query targeting a record stored in the external DB 3, the information processing device 1 offloads the execution of the accepted query to the information processing device 2. Then, the information processing device 2 executes the query offloaded from the information processing device 1 in parallel on the plurality of servers.

With this procedure, the information processing system 10 may be allowed to efficiently execute the query input by the user. Therefore, the business operator may be allowed to construct a multi-model database capable of efficiently using the external DBs 3.

Note that, in the example illustrated in FIG. 1, the information processing device 1 may not include the internal DB 1*a*. For example, the business operator may store all the data for which the user performs various operations in the external DB 3. Furthermore, in the example illustrated in FIG. 1, a case where the information processing system 10 includes the three external DBs 3 has been described, but the information processing system 10 may include a number of external DBs 3 other than three.

[Hardware Configuration of Information Processing System]

Figure 2:
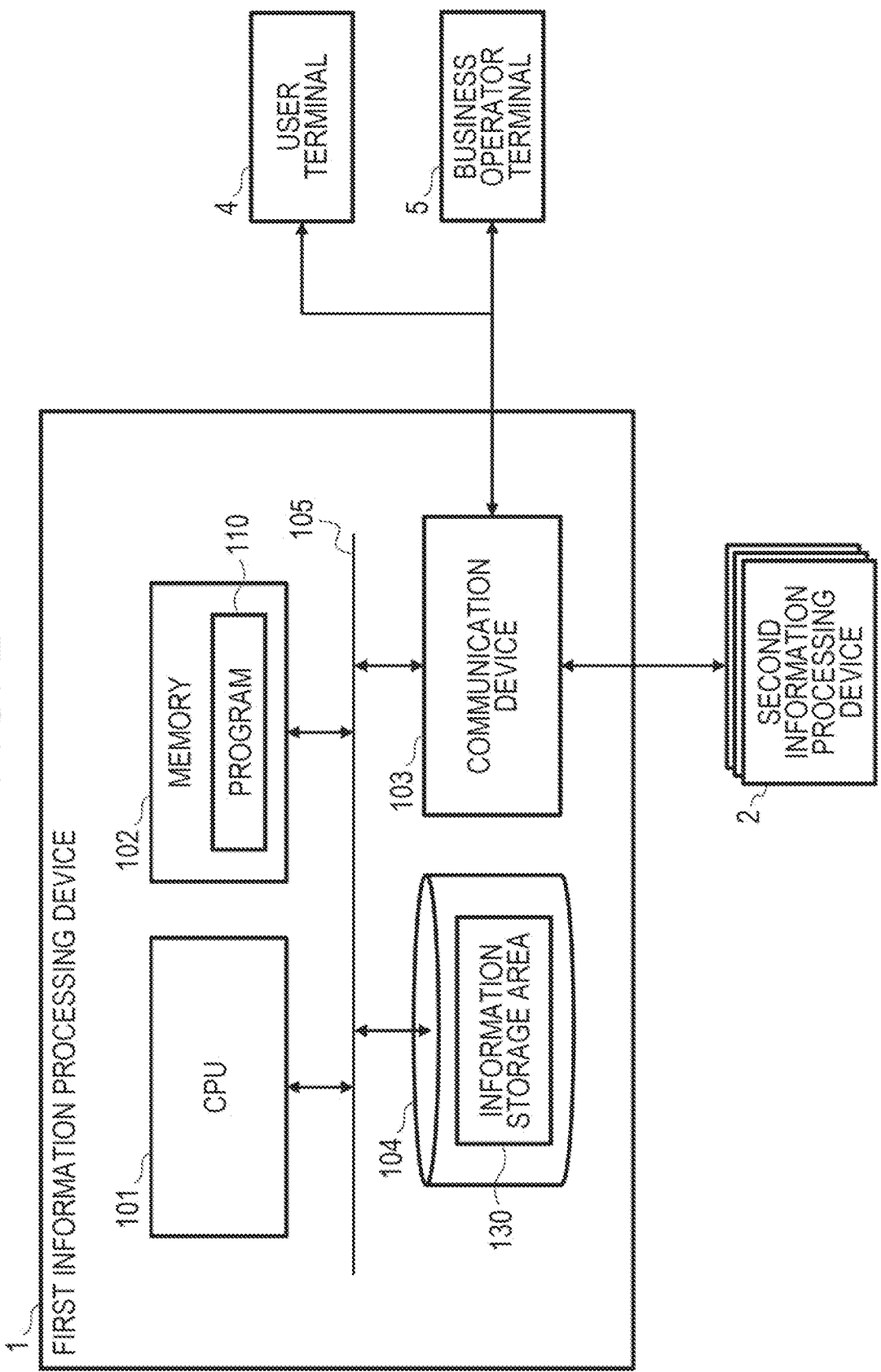
FIG. 2 is a diagram explaining a hardware configuration of an information processing device 1.
Figure 3:
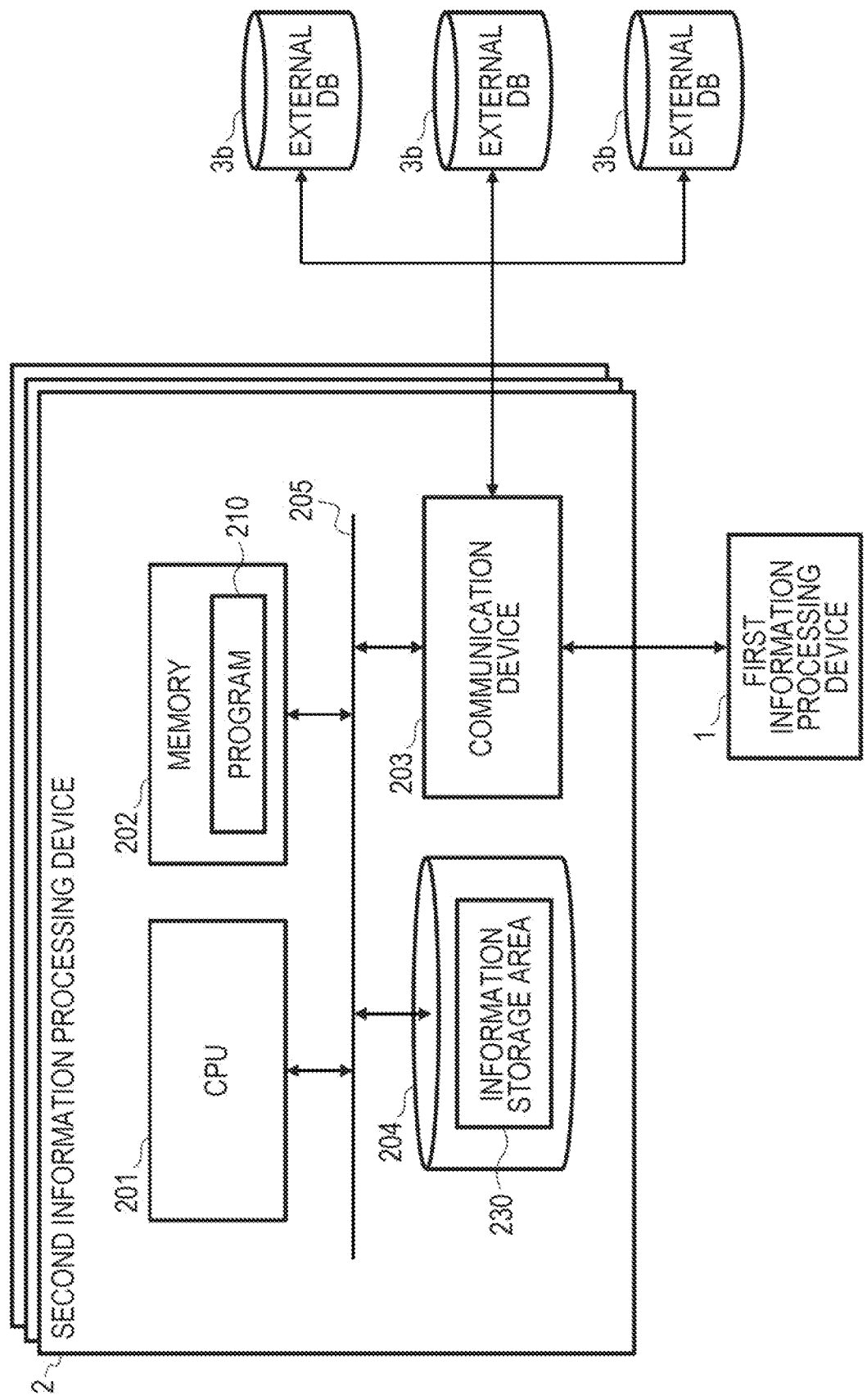
FIG. 3 is a diagram explaining a hardware configuration of an information processing device 2.
Figure 4:
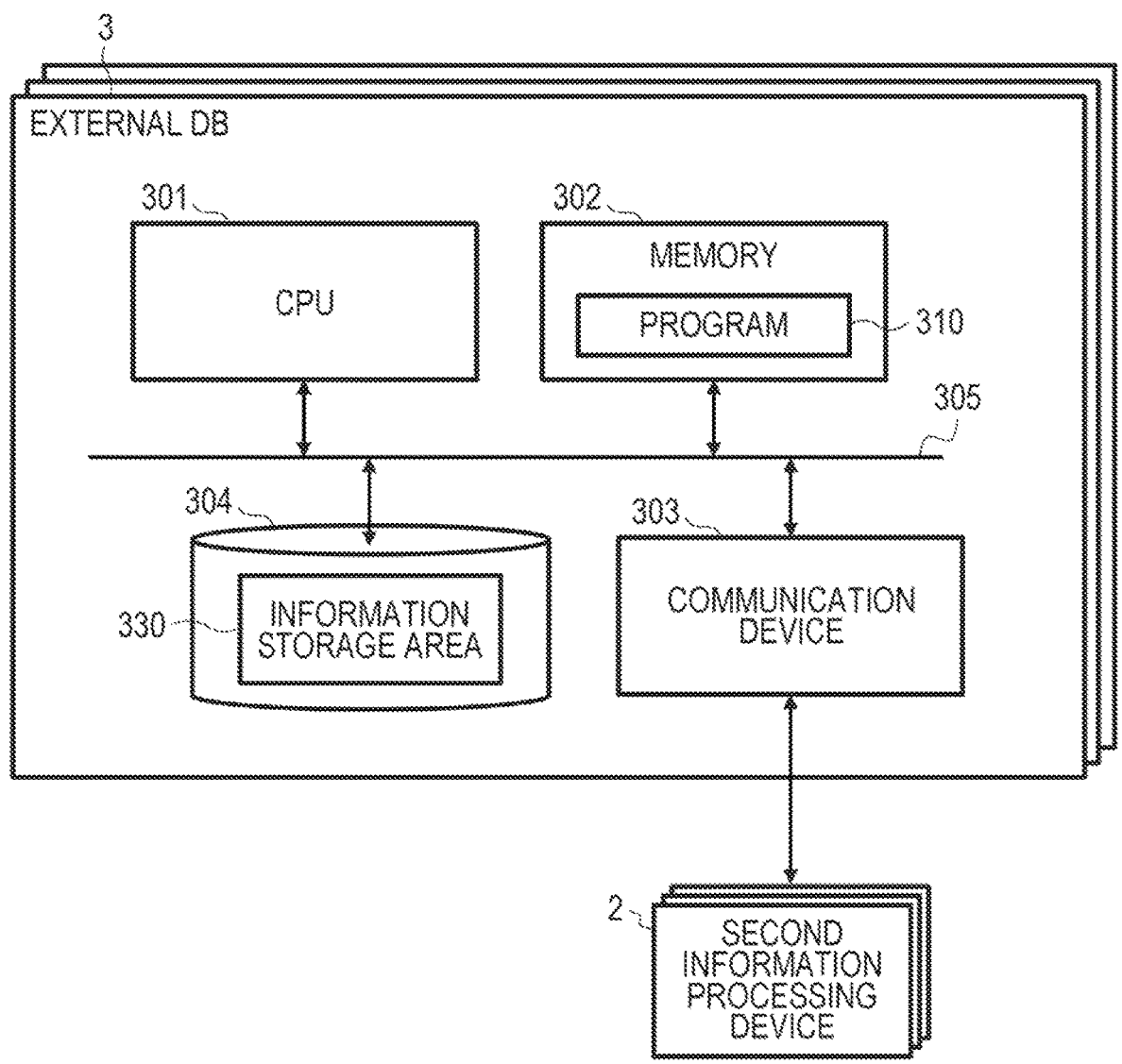
FIG. 4 is a diagram explaining a hardware configuration of an external database (DB) 3.

Next, a hardware configuration of the information processing system 10 will be described. FIG. 2 is a diagram explaining a hardware configuration of the information processing device 1. Furthermore, FIG. 3 is a diagram explaining a hardware configuration of the information processing device 2. In addition, FIG. 4 is a diagram explaining a hardware configuration of the external DB 3.

First, the hardware configuration of the information processing device 1 will be described.

As illustrated in FIG. 2, the information processing device 1 includes a central processing unit (CPU) 101, which is a processor, a memory 102, a communication device 103, and a storage medium 104. The respective units are interconnected via a bus 105.

The storage medium 104 has, for example, a program storage area (not illustrated) that stores a program 110 for performing a process of executing a query (hereinafter, also referred to as a query execution process). Furthermore, the storage medium 104 has, for example, an information storage area 130 that stores information used when the query execution process is performed. Note that the storage medium 104 can be, for example, a hard disk drive (HDD) or a solid state drive (SSD).

The CPU 101 executes the program 110 loaded from the storage medium 104 into the memory 102 to perform the query execution process.

Furthermore, the communication device 103 communicates with the information processing device 2, the user terminal 4, and the business operator terminal 5 via a network, for example.

Next, the hardware configuration of the information processing device 2 will be described.

As illustrated in FIG. 3, the information processing device 2 includes a CPU 201, which is a processor, a memory 202, a communication device 203, and a storage medium 204. The respective units are interconnected via a bus 205.

The storage medium 204 has, for example, a program storage area (not illustrated) that stores a program 210 for performing the query execution process. Furthermore, the storage medium 204 has, for example, an information storage area 230 that stores information used when the query execution process is performed. Note that the storage medium 204 can be, for example, an HDD or an SSD.

The CPU 201 executes the program 210 loaded from the storage medium 204 into the memory 202 to perform the query execution process.

Furthermore, the communication device 203 communicates with the information processing device 1 and the external DB 3 via a network, for example.

Next, the hardware configuration of the external DB 3 will be described.

As illustrated in FIG. 4, the external DB 3 includes a CPU 301, which is a processor, a memory 302, a communication device 303, and a storage medium 304. The respective units are interconnected via a bus 305.

The storage medium 304 has, for example, a program storage area (not illustrated) that stores a program 310 for performing the query execution process. Furthermore, the storage medium 304 has, for example, an information storage area 330 that stores information used when the query execution process is performed. Note that the storage medium 304 can be, for example, an HDD or an SSD.

The CPU 301 executes the program 310 loaded from the storage medium 304 into the memory 302 to perform the query execution process.

Furthermore, the communication device 303 communicates with the information processing device 2 via a network, for example.

[Functions of Information Processing System]

Figure 5:
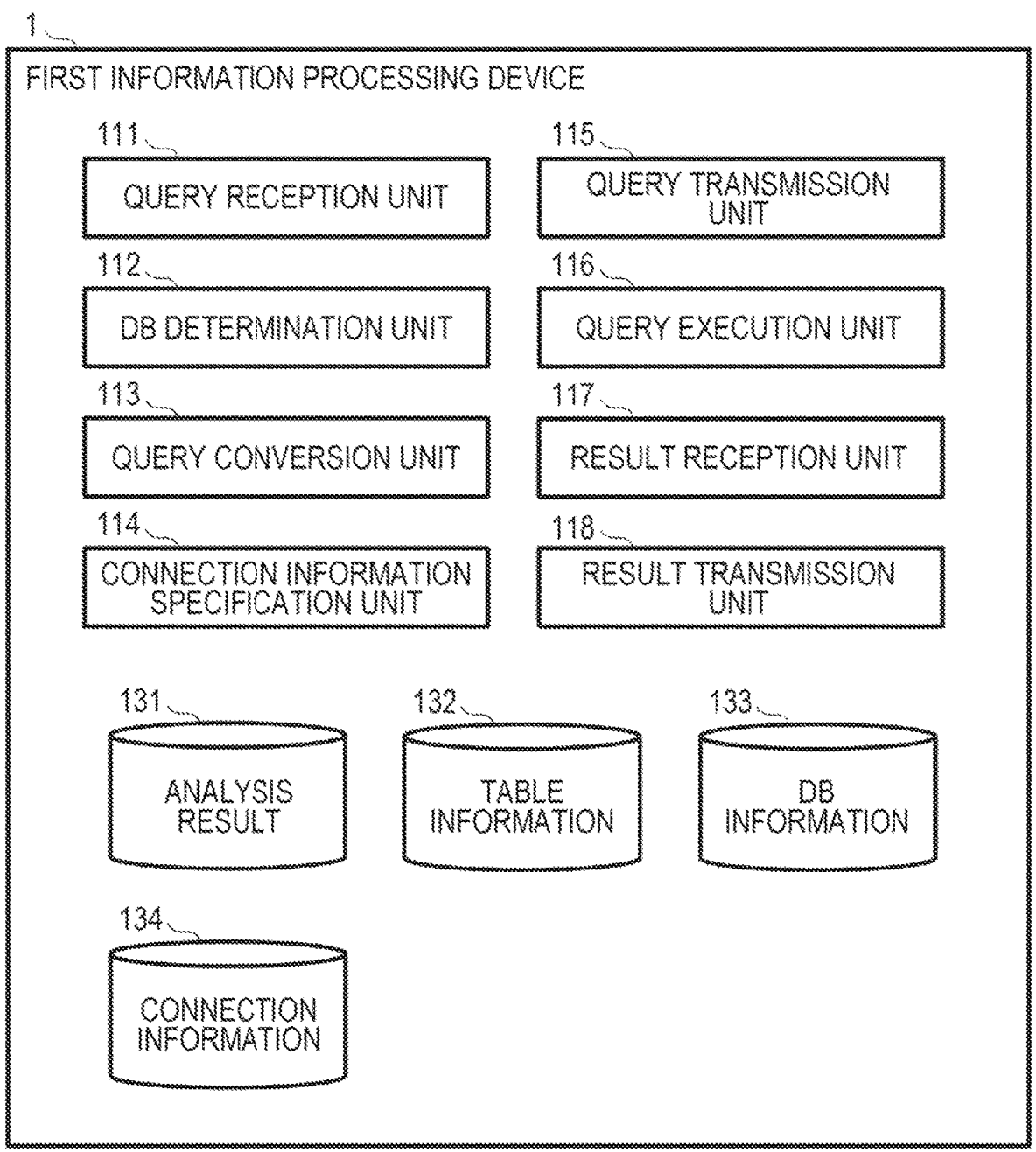
FIG. 5 is a block diagram of the functions of the information processing device 1.
Figure 6:
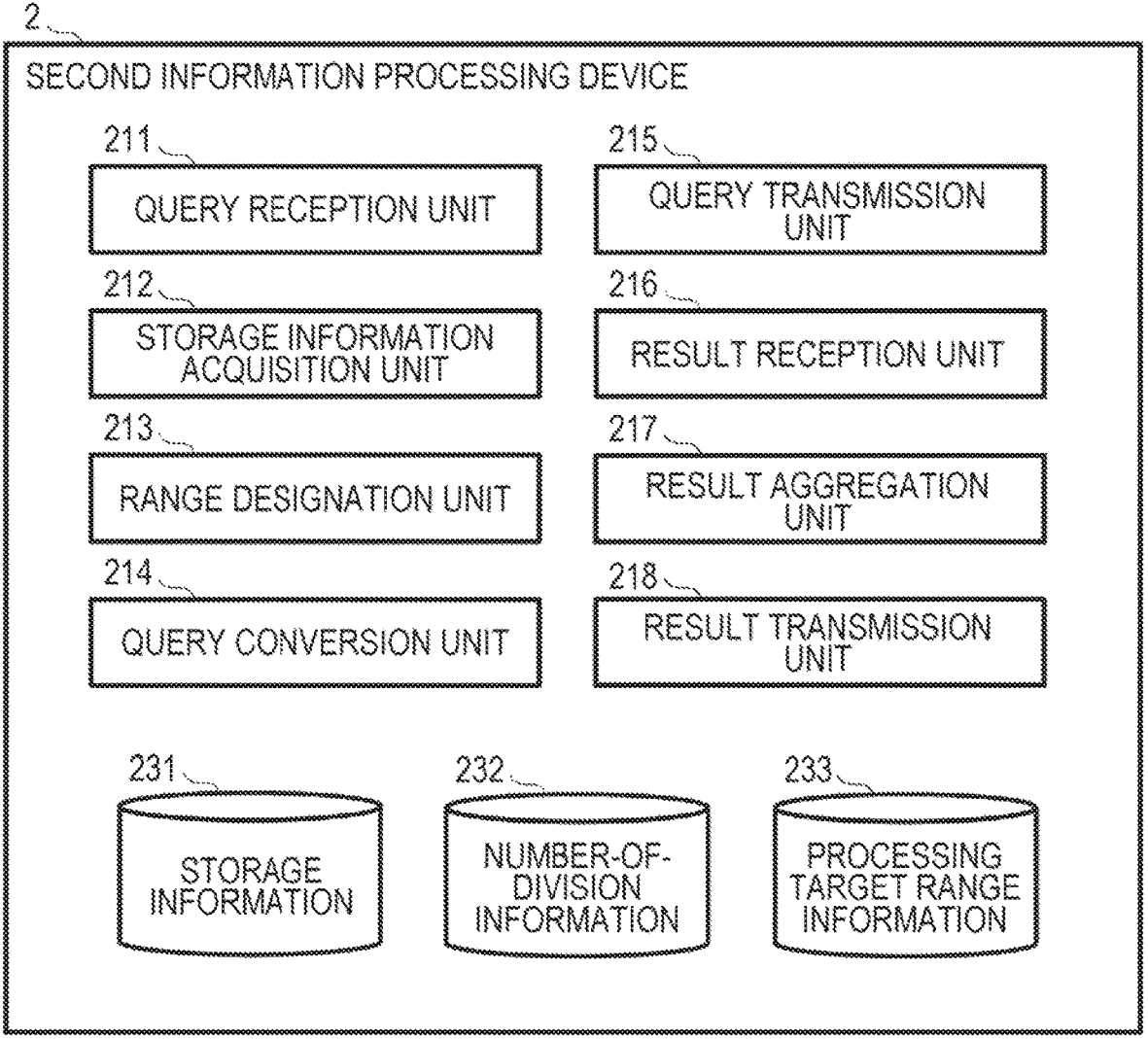
FIG. 6 is a block diagram of the functions of the information processing device 2.
Figure 7:
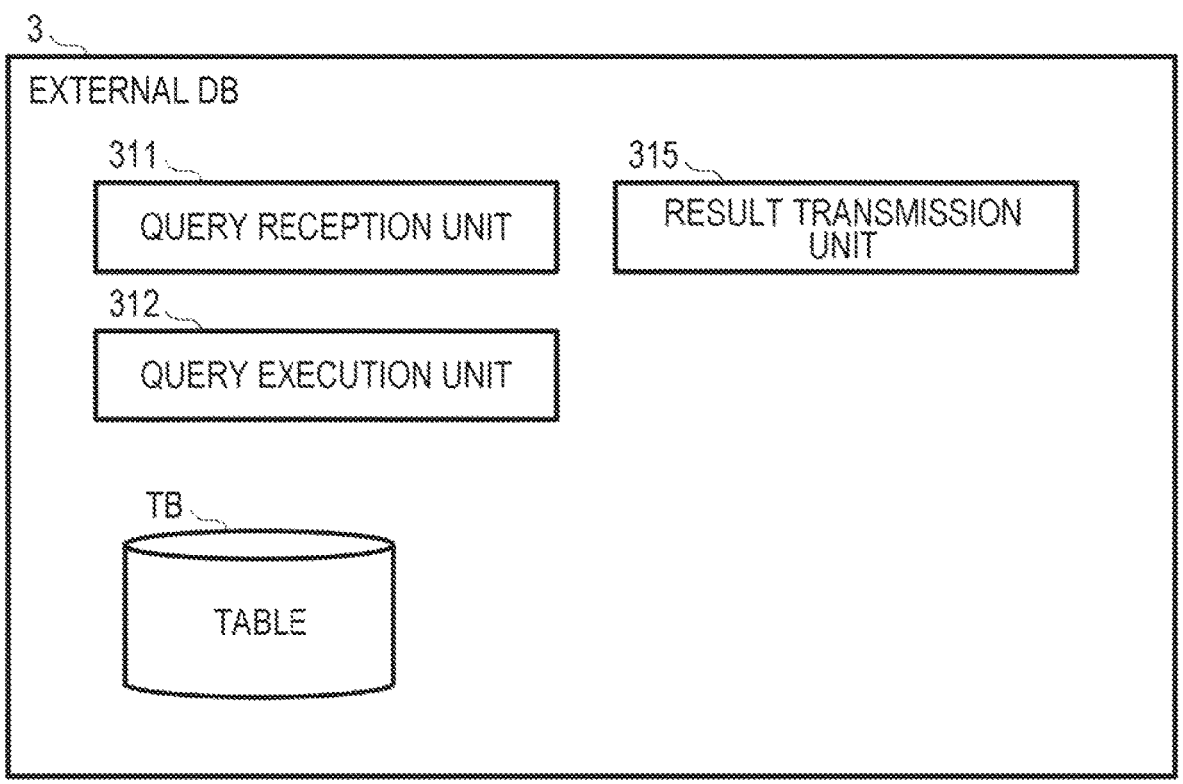
FIG. 7 is a block diagram of the functions of the external DB 3.

Next, the functions of the information processing system 10 will be described. FIG. 5 is a block diagram of the functions of the information processing device 1. Furthermore, FIG. 6 is a block diagram of the functions of the information processing device 2. In addition, FIG. 7 is a block diagram of the functions of the external DB 3.

First, the block diagram of the functions of the information processing device 1 will be described.

As illustrated in FIG. 5, in the information processing device 1, various functions including a query reception unit 111, a DB determination unit 112, a query conversion unit 113, a connection information specification unit 114, a query transmission unit 115, a query execution unit 116, a result reception unit 117, and a result transmission unit 118 are implemented, for example, by the hardware such as the CPU 101 and the memory 102 and the program 110 organically collaborating with each other.

Furthermore, for example, as illustrated in FIG. 5, the information processing device 1 stores an analysis result 131, table information 132, DB information 133, and connection information 134 in the information storage area 130.

The query reception unit 111 receives, for example, a query issued by the user via the user terminal 4.

The DB determination unit 112 determines whether or not at least a part of records targeted by the query received by the query reception unit 111 is included in a table TB (hereinafter, also referred to as an external table TB) stored in the external DB 3.

For example, when the DB determination unit 112 determines that at least a part of the records targeted by the query received by the query reception unit 111 is included in the external table TB, the query conversion unit 113 converts the query received by the query reception unit 111 into a query that can be executed by the information processing device 2 (hereinafter, also referred to as a first conversion query).

The connection information specification unit 114 refers to the table information 132 and the DB information 133 stored in the information storage area 130, and specifies the connection information 134 for accessing the external table TB in which at least a part of the records targeted by the query is stored. The table information 132 is information indicating the external tables TB stored in the respective external DBs 3. Furthermore, the DB information 133 is information regarding each of the external DBs 3.

The query transmission unit 115 transmits the first conversion query converted by the query conversion unit 113 and the connection information 134 specified by the connection information specification unit 114 to the information processing device 2. The connection information 134 is information required to access each of the external tables TB.

The query execution unit 116 executes the query received by the query reception unit 111, for example, using a record included in each table stored in the internal DB 1a as a target.

The result reception unit 117 receives the execution result of the first conversion query transmitted by the query transmission unit 115 to the information processing device 2, from the information processing device 2.

The result transmission unit 118 transmits the execution result received by the result reception unit 117 to the user terminal 4 that has issued the query received by the query reception unit 111. The explanation of the analysis result 131 will be described later.

Next, the block diagram of the functions of the information processing device 2 will be described.

As illustrated in FIG. 6, in the information processing device 2, various functions including a query reception unit 211, a storage information acquisition unit 212, a range designation unit 213, a query conversion unit 214, a query transmission unit 215, a result reception unit 216, a result aggregation unit 217, and a result transmission unit 218 are implemented, for example, by the hardware such as the CPU 201 and the memory 202 and the program 210 organically collaborating with each other.

Note that the query reception unit 211, the storage information acquisition unit 212, the range designation unit 213, the result aggregation unit 217, and the result transmission unit 218 are functions, for example, in a master server in the server group constituting the information processing device 2. Furthermore, the query conversion unit 214, the query transmission unit 215, and the result reception unit 216 are functions, for example, in each of slave servers in the server group constituting the information processing device 2.

Furthermore, for example, as illustrated in FIG. 6, the information processing device 2 stores storage information 231, number-of-division information 232, and processing target range information 233 in the information storage area 230.

The query reception unit 211 receives the first conversion query and the connection information 134 transmitted from the information processing device 1.

The storage information acquisition unit 212 connects to the external DB 3 based on the connection information 134 received by the query reception unit 211, and acquires the storage information 231 indicating the storage position in the external table TB targeted by the first conversion query received by the query reception unit 211, among the external tables TB stored in the connected external DB 3.

The range designation unit 213 refers to the storage information 231 acquired by the storage information acquisition unit 212, and designates the processing target range for a record (a record included in the external table TB) targeted by the first conversion query received by the query reception unit 211, for each of tasks, the number of which corresponds to the number-of-division information 232 stored in the information storage area 130. Then, the range designation unit 213 generates, for example, the processing target range information 233 indicating the processing target designated for each task.

The query conversion unit 214 converts the first conversion query received by the query reception unit 111 into a query (hereinafter, also referred to as a second conversion query) whose execution target is a record included in the processing target range of each task while the external DB 3 that stores the record included in the processing target range of each task is in an executable state, for each of tasks, the number of which corresponds to the number-of-division information 232 stored in the information storage area 130.

The query transmission unit 215 transmits the second conversion query corresponding to each task to the external DB 3 that stores the external table TB corresponding to the processing target range of each task, for each of tasks, the number of which corresponds to the number-of-division information 232 stored in the information storage area 130.

The result reception unit 216 receives the execution results (the execution results for each task) of the second conversion query transmitted by the query transmission unit 215 to the external DB 3, from the external DB 3 to which the query transmission unit 115 have transmitted the second conversion query.

The result aggregation unit 217, for example, merges, reorganizes, aggregates, and sorts the execution results (the execution results for each task) received by the result reception unit 216.

The result transmission unit 218 transmits the execution results obtained by the aggregation and the like by the result aggregation unit 217 to the information processing device 1.

Next, the block diagram of the functions of the external DB 3 will be described.

As illustrated in FIG. 7, in the external DB 3, various functions including a query reception unit 311, a query execution unit 312, and a result transmission unit 313 are implemented, for example, by the hardware such as the CPU 301 and the memory 302 and the program 310 organically collaborating with each other.

Furthermore, for example, as illustrated in FIG. 7, the external DB 3 stores one or more external tables TB in the information storage area 330.

The query reception unit 311 receives the second conversion query transmitted from the information processing device 2.

The query execution unit 312 executes the second conversion query received by the query reception unit 311.

The result transmission unit 313 transmits the execution result of the second conversion query executed by the query execution unit 312 to the information processing device 2.

[Outline of First Embodiment]

Figure 8:
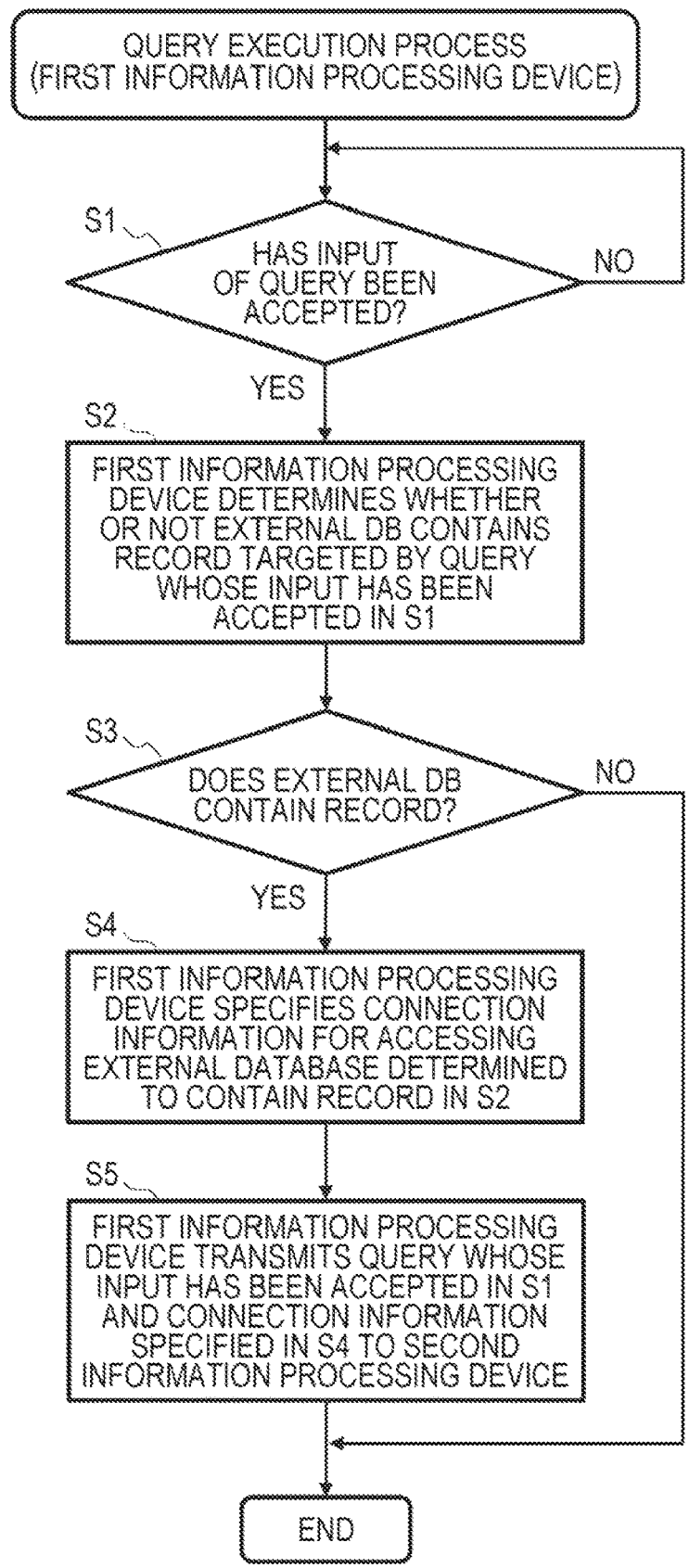
FIG. 8 is a flowchart diagram explaining an outline of a query execution process according to a first embodiment.
Figure 9:
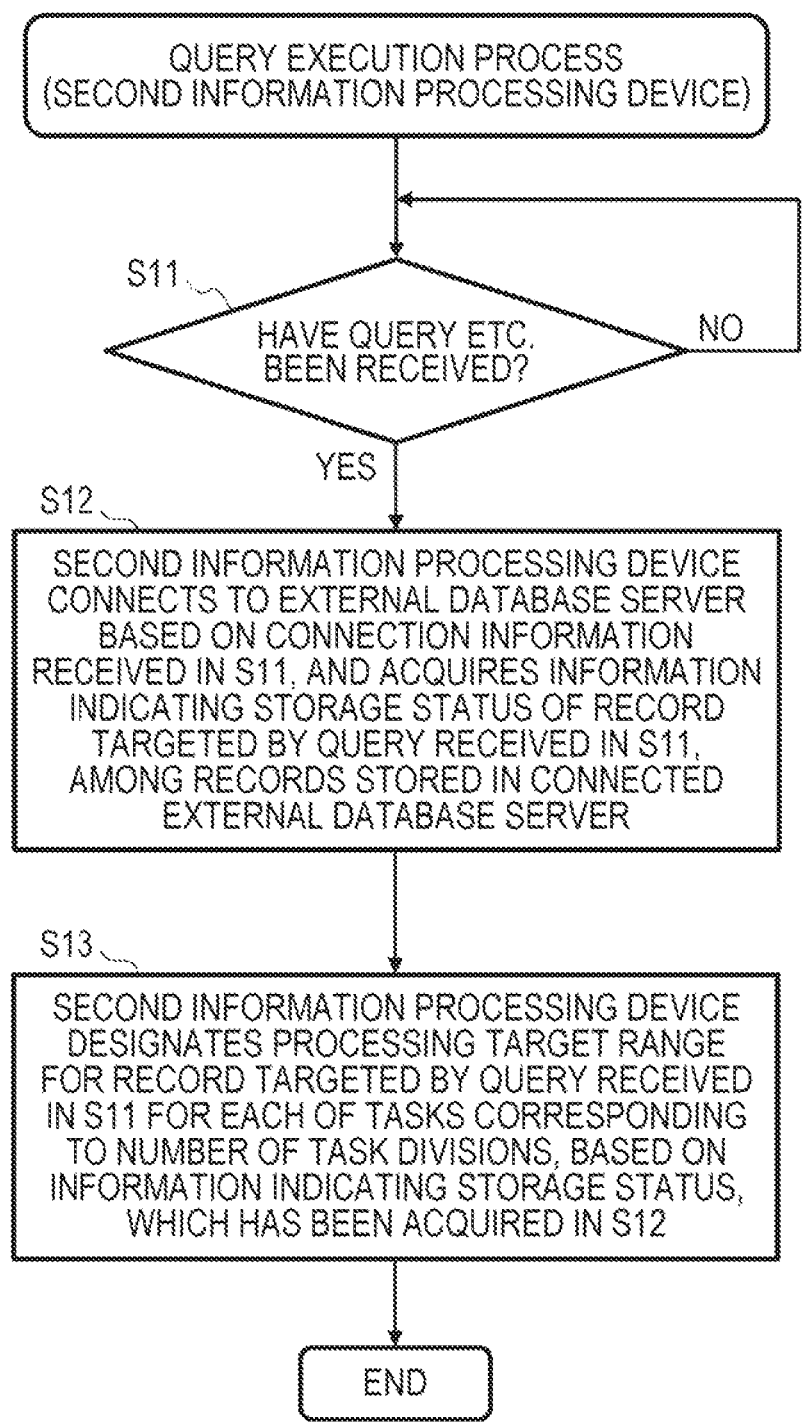
FIG. 9 is a flowchart diagram explaining an outline of the query execution process according to the first embodiment.
Figure 10:
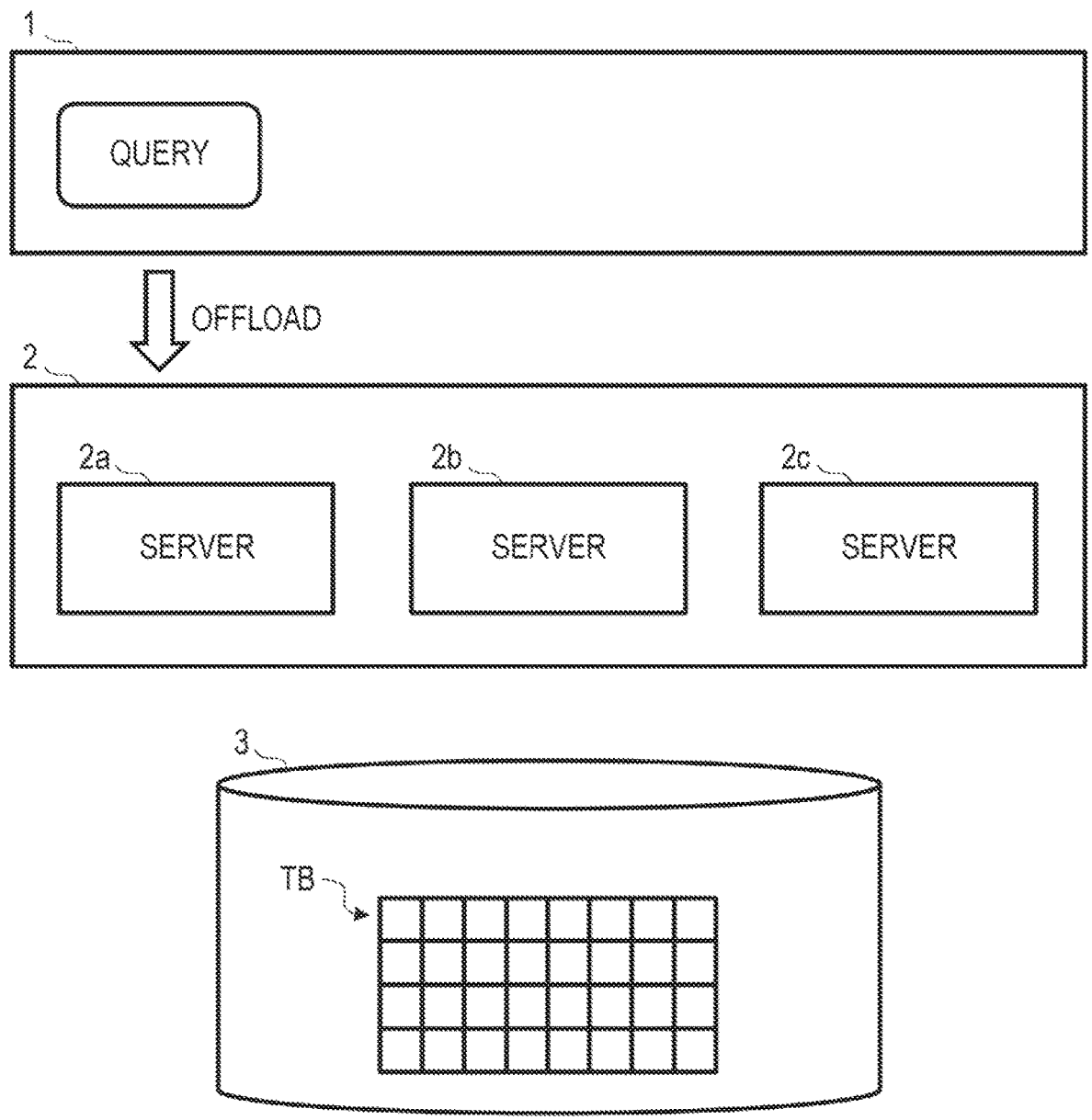
FIG. 10 is a diagram explaining an outline of the query execution process according to the first embodiment.
Figure 11:
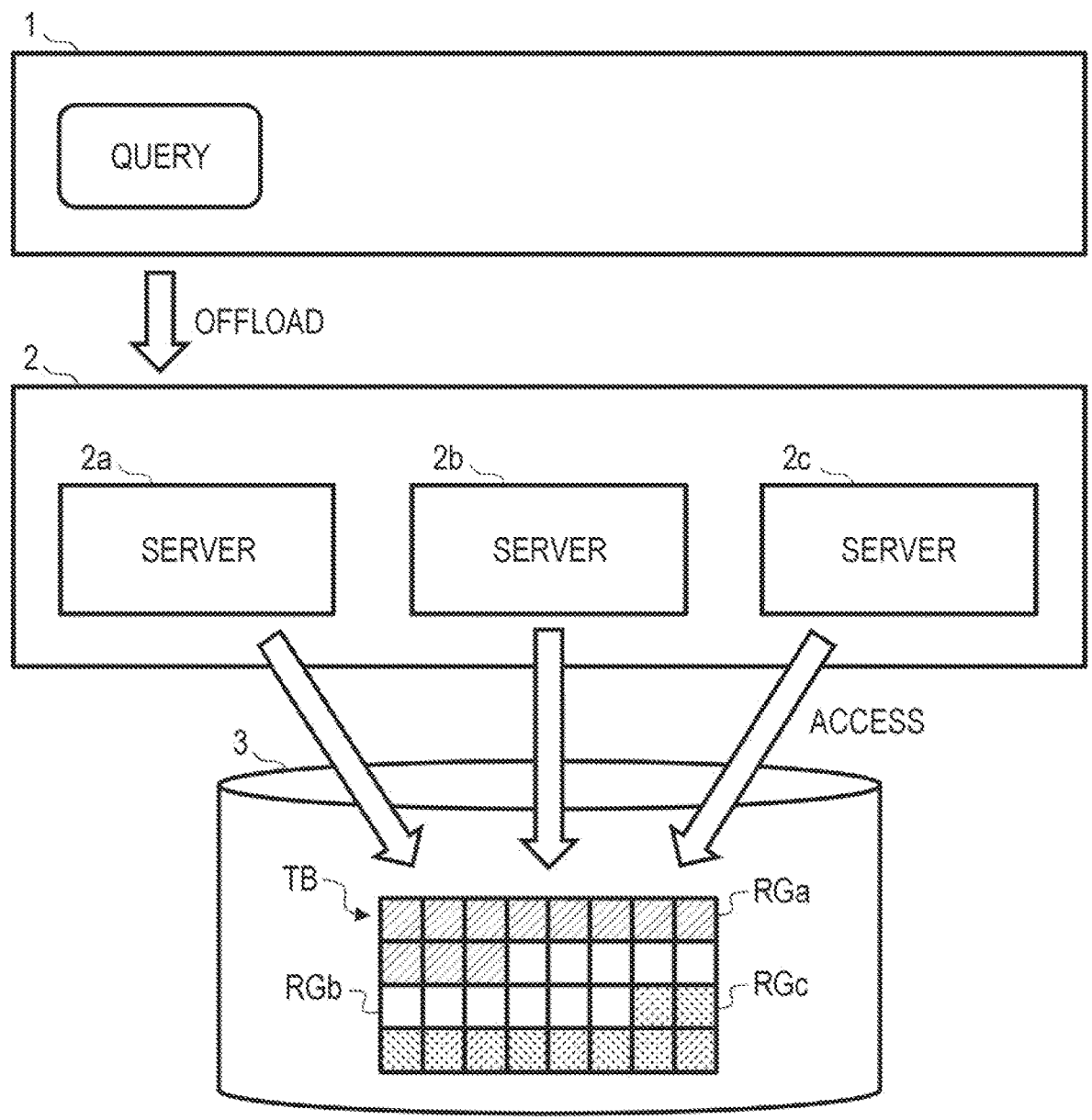
FIG. 11 is a diagram explaining an outline of the query execution process according to the first embodiment.

Next, an outline of a first embodiment will be described. FIGS. 8 and 9 are flowchart diagrams explaining an outline of the query execution process according to the first embodiment. FIGS. 10 and 11 are diagrams explaining an outline of the query execution process according to the first embodiment.

As illustrated in FIG. 8, the information processing device 1 waits until accepting, for example, a query input by the user via the user terminal 4 (NO in S1).

Then, when accepting a query (YES in S1), the information processing device 1 determines whether or not the external DB 3 contains a record targeted by the query whose input has been accepted in the process in S1 (S2).

As a result, when it is determined that the external DB 3 contains the record targeted by the query whose input has been accepted in the process in S1 (YES in S3), the information processing device 1 specifies the connection information 134 for accessing the external DB 3 determined to contain the record in the process in S2 (S4).

Thereafter, the information processing device 1 transmits the query whose input has been accepted in the process in S1 and the connection information 134 specified in the process in S4 to the information processing device 2 (S5).

Alternatively, when it is determined that the external DB 3 does not contain the record targeted by the query whose input has been accepted in the process in S1 (NO in S3), the information processing device 1 does not perform the processes in S4 and S5.

Meanwhile, as illustrated in FIG. 9, the information processing device 2 waits until the query and the connection information 134 transmitted by the information processing device 1 are received (NO in S11).

Then, when the query and the connection information 134 transmitted by the information processing device 1 are received (YES in S11), the information processing device 2 connects to the external DB 3 based on the received connection information 134, and acquires the storage information 231 indicating the storage status of the record targeted by the query received in the process in S11, among records stored in the connected external DB 3 (S12).

Thereafter, the information processing device 2 designates the processing target range for each of a plurality of tasks relevant to the record targeted by the query received in the process in S11, based on the storage information 231 acquired in the process in S12 (S13).

For example, when accepting a query targeting a record stored in the external DB 3, the information processing device 1 offloads the execution of the accepted query to the information processing device 2. Then, the information processing device 2 distributes the query offloaded from the information processing device 1 to the plurality of servers to execute the query.

For example, as illustrated in FIG. 10, when the execution target of the query is a record included in the external table TB, each of servers 2a, 2b, and 2c (slave servers 2a, 2b, and 2c) constituting the information processing device 2 executes the query, for example, as illustrated in FIG. 11, using a record group designated as the processing target range of each server as a target, among record groups RGa, RGb, and RGc that are consecutively stored in the external table TB.

With this configuration, the information processing system 10 may be allowed to efficiently execute the query by the information processing device 2. Therefore, the business operator may be allowed to construct a multi-model database capable of efficiently using the external DBs 3.

[Details of First Embodiment]

Next, the details of the first embodiment will be described. FIGS. 12 to 16 are flowchart diagrams explaining the details of the query execution process according to the first embodiment. Furthermore, FIGS. 17 to 24 are diagrams explaining the details of the query execution process according to the first embodiment.

[Query Execution Process Performed in First Information Processing Device]

Figure 12:
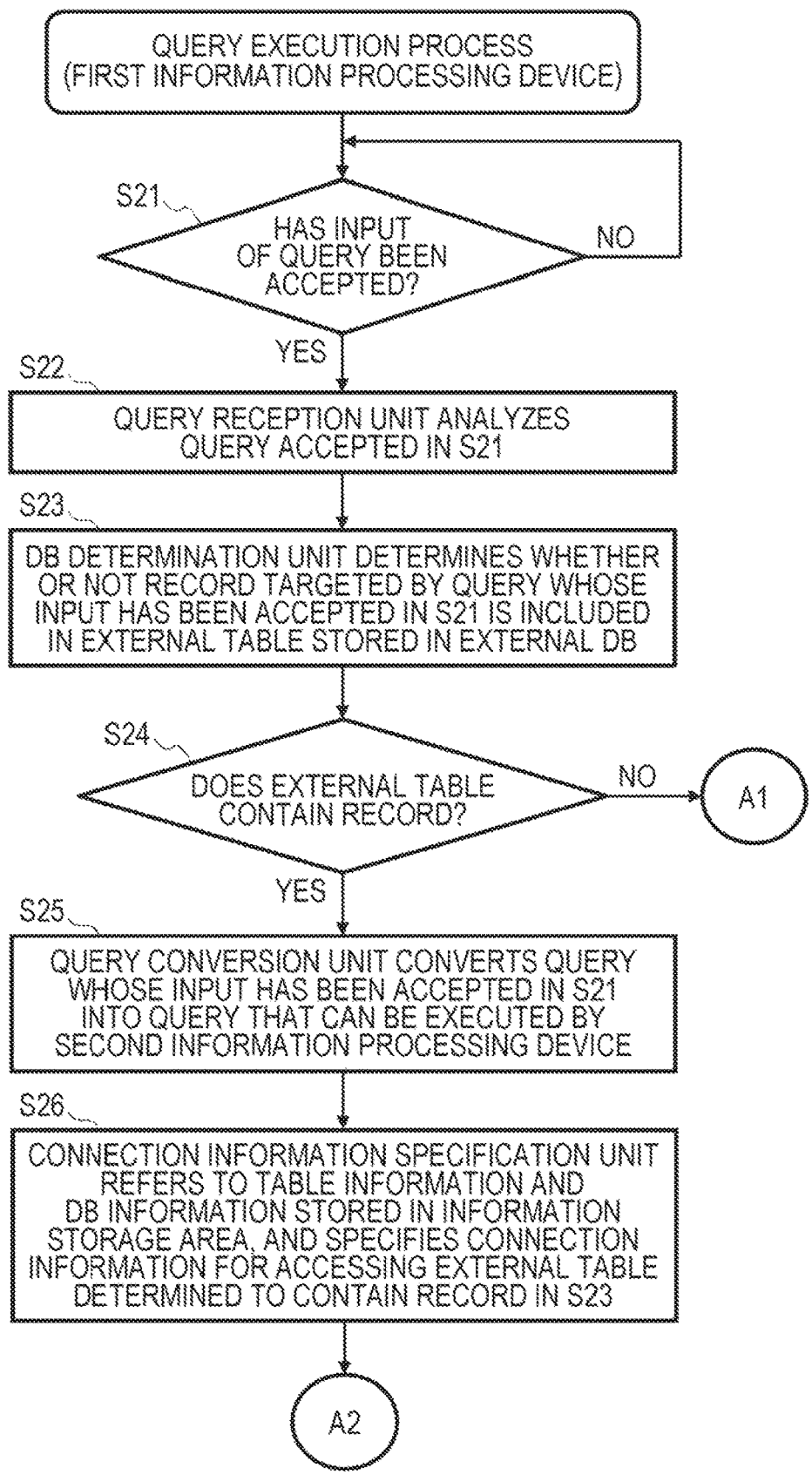
FIG. 12 is a flowchart diagram explaining the details of the query execution process according to the first embodiment.
Figure 13:
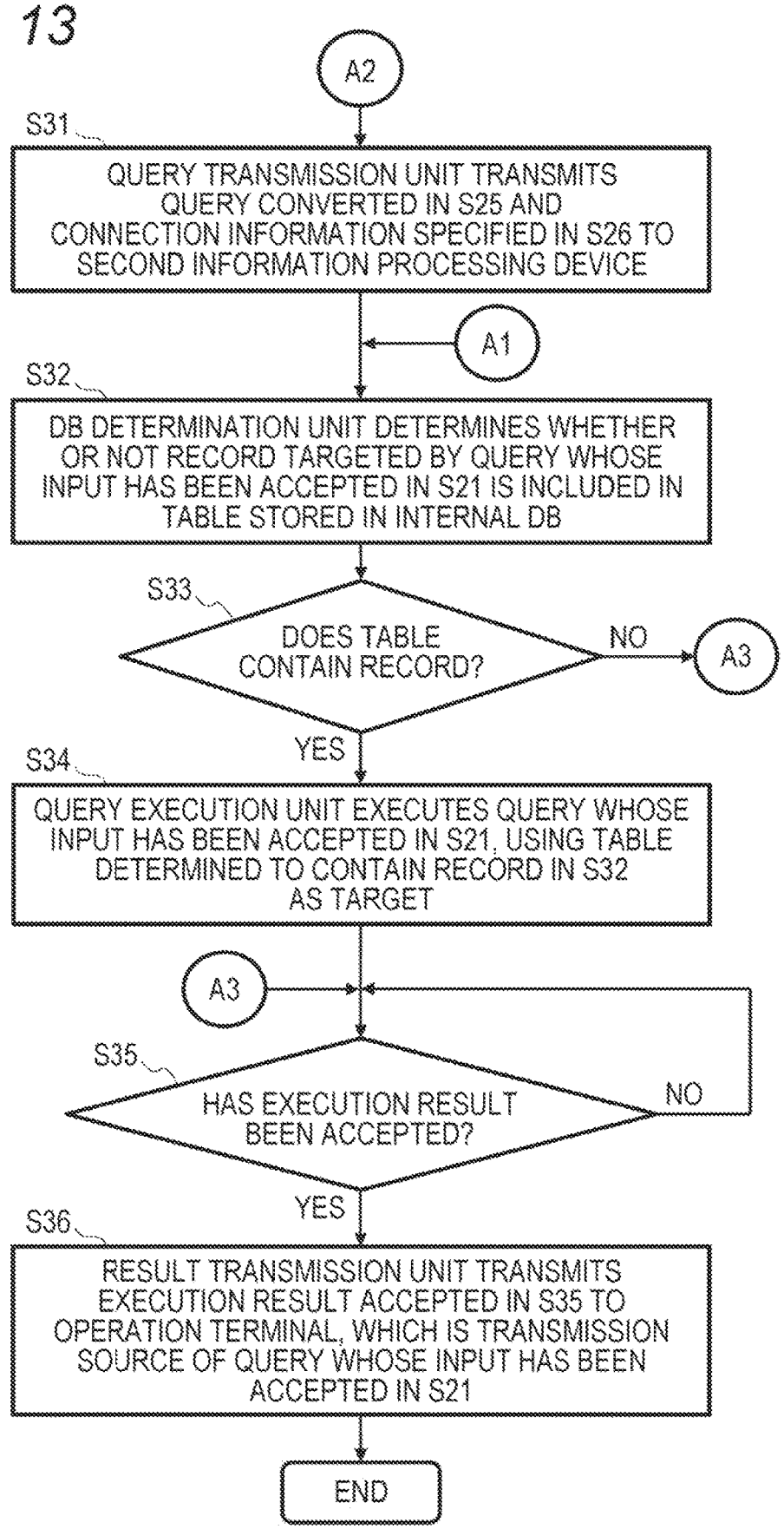
FIG. 13 is a flowchart diagram explaining the details of the query execution process according to the first embodiment.

First, in the query execution process, a query execution process performed in the information processing device 1 will be described. FIGS. 12 and 13 are diagrams explaining the query execution process performed in the information processing device 1.

As illustrated in FIG. 12, the query reception unit 111 of the information processing device 1 waits until accepting, for example, a query input by the user via the user terminal 4 (NO in S21).

Then, when accepting a query (YES in S21), for example, the query reception unit 111 analyzes the accepted query (S22). The analysis result for the query will be described below.

[Specific Example of Analysis Result for Query]

FIG. 17 is a diagram explaining a specific example of the analysis result 131 for a query.

The analysis result 131 illustrated in FIG. 17 includes, for example, various kinds of information referred to in each process described later. For example, the analysis result 131 illustrated in FIG. 17 includes information indicating that there is an external table TB (an external table whose "relid (external table ID)" has "16001") targeted by the query accepted in the process in S21.

Returning to FIG. 12, the DB determination unit 112 of the information processing device 1 determines whether or not the record targeted by the query whose input has been accepted in the process in S21 is included in the external table TB stored in the external DB 3 (S23).

For example, the DB determination unit 112 refers to the analysis result 131 described with reference to FIG. 17, and determines that there is an external table whose "external table ID" has "16001" as the external table TB targeted by the query whose input has been accepted in the process in S21.

Then, when it is determined that the record targeted by the query whose input has been accepted in the process in S21 is included in the external table TB stored in the external DB 3 (YES in S24), the query conversion unit 214 of the information processing device 1 generates the first conversion query by converting the query accepted in the process in S21 into a query that can be executed by the information processing device 2 (S25).

Thereafter, the connection information specification unit 114 of the information processing device 1 refers to the table information 132 and the DB information 133 stored in the information storage area 130, and specifies the connection information 134 for accessing the external table TB determined to contain the record in the process in S23 (S26). Hereinafter, specific examples of the table information 132, the DB information 133, and the connection information 134 will be described.

[Specific Example of Table Information]

First, a specific example of the table information 132 will be described. FIG. 18 is a diagram explaining a specific example of the table information 132.

The table information 132 illustrated in FIG. 18 has, as items, "external table ID" that identifies the external table TB, and "external DB ID" that identifies the external DB 3.

For example, in the table information 132 illustrated in FIG. 18, "16001" is set as "external table ID" and "21001" is set as "external DB ID" in the information in the first row. Furthermore, in the table information 132 illustrated in FIG. 18, "16002" is set as "external table ID" and "21002" is set as "external DB ID" in the information in the second row. A description for other information included in FIG. 18 is omitted.

[Specific Example of DB Information]

Next, a specific example of the DB information 133 will be described. FIG. 19 is a diagram explaining a specific example of the DB information 133.

The DB information 133 illustrated in FIG. 19 has, as items, "external DB ID" that identifies the external DB 3, "host" in which the IP address of the external DB 3 is set, "port" in which the port number of the external DB 310 is set, and "DB name" in which the name of the external DB 3 is set. Furthermore, the DB information 133 illustrated in FIG. 19 has, as items, "user" and "password" in which the user name and password required to access the external DB 3 are set, respectively.

For example, in the DB information 133 illustrated in FIG. 19, "21001" is set as "external DB ID", "192.168.100.100" is set as "host", and "1234" is set as "port" in the information in the first row. In addition, in the information in the first row, "DB1" is set as "DB name", "user1" is set as "user", and "AAAA" is set as "password".

Furthermore, in the DB information 133 illustrated in FIG. 19, "21002" is set as "external DB ID", "192.168.100.200" is set as "host", and "5678" is set as "port" in the information in the second row. In addition, in the information in the second row, "DB2" is set as "DB name", "user2" is set as "user", and "BBBB" is set as "password". A description for other information included in FIG. 19 is omitted.

[Specific Example of Connection Information]

Next, a specific example of the connection information 134 will be described. FIG. 20 is a diagram explaining a specific example of the connection information 134.

The connection information 134 illustrated in FIG. 20 has, as items, "external table ID" that identifies the external table, "host" in which the IP address of the external DB 3 is set, "port" in which the port number of the external DB 3 is set, and "DB name" in which the name of the external DB 3 is set. Furthermore, the connection information 134 illustrated in FIG. 20 has, as items, "user" and "password" in which the user name and password required to access the external DB 3 are set, respectively.

For example, in the table information 132 described with reference to FIG. 18, "16001" is set as "external table ID" and "21001" is set as "external DB ID" in the information in the first row. Furthermore, in the table information 132 described with reference to FIG. 19, "21001" is set as "external DB ID", "192.168.100.100" is set as "host", and. "1234" is set as "port", "DB1" is set as "DB name", "user1" is set as "user", and "AAAA" is set as "password" in the information in the first row. Moreover, the analysis result 131 described with reference to FIG. 17 includes information that there is an external table whose "external table ID" has "16001" as the external table targeted by the query whose input has been accepted in the process in S21.

Therefore, in the process in S26, for example, as illustrated in FIG. 20, the connection information specification unit 114 specifies information in which "16001" is set in "external table ID", "192.168.100.100" is set in "host", "1234" is set in "port", "DB1" is set in "DB name", "user1" is set in "user", and "AAAA" is set in "password" (the information in the first row).

Returning to FIG. 13, the query transmission unit 115 of the information processing device 1 transmits the first conversion query converted in the process in S25 and the connection information 134 specified in the process in S26 to the information processing device 2 (S31).

Then, the DB determination unit 112 determines whether or not the record targeted by the query whose input has been accepted in the process in S21 is included in the table stored in the internal DB 1a (S32).

As a result, when it is determined that the record targeted by the query whose input has been accepted in the process in S21 is included in the table stored in the internal DB 1a (YES in S33), the query execution unit 116 of the information processing device 1 executes the query whose input has been accepted in the process in S21, using each table stored in the internal DB 1a as a target (S34).

On the other hand, when it is determined that the record targeted by the query whose input has been accepted in the process in S21 is not included in the table stored in the internal DB 1a (NO in S33), the query execution unit 116 does not execute the process in S34.

Thereafter, the result reception unit 117 of the information processing device 1 waits until accepting the execution result of the first conversion query transmitted in the process in S31 from the information processing device 2 (NO in S35).

Then, when the execution result of the first conversion query transmitted in the process in S31 is accepted from the information processing device 2 (YES in S35), the result transmission unit 118 of the information processing device 1 transmits the execution result accepted in the process in S35, for example, to the user terminal 4, which is transmission source of the query whose input has been accepted in the process in S21 (S36).

[Query Execution Process Performed in Second Information Processing Device]

Figure 14:
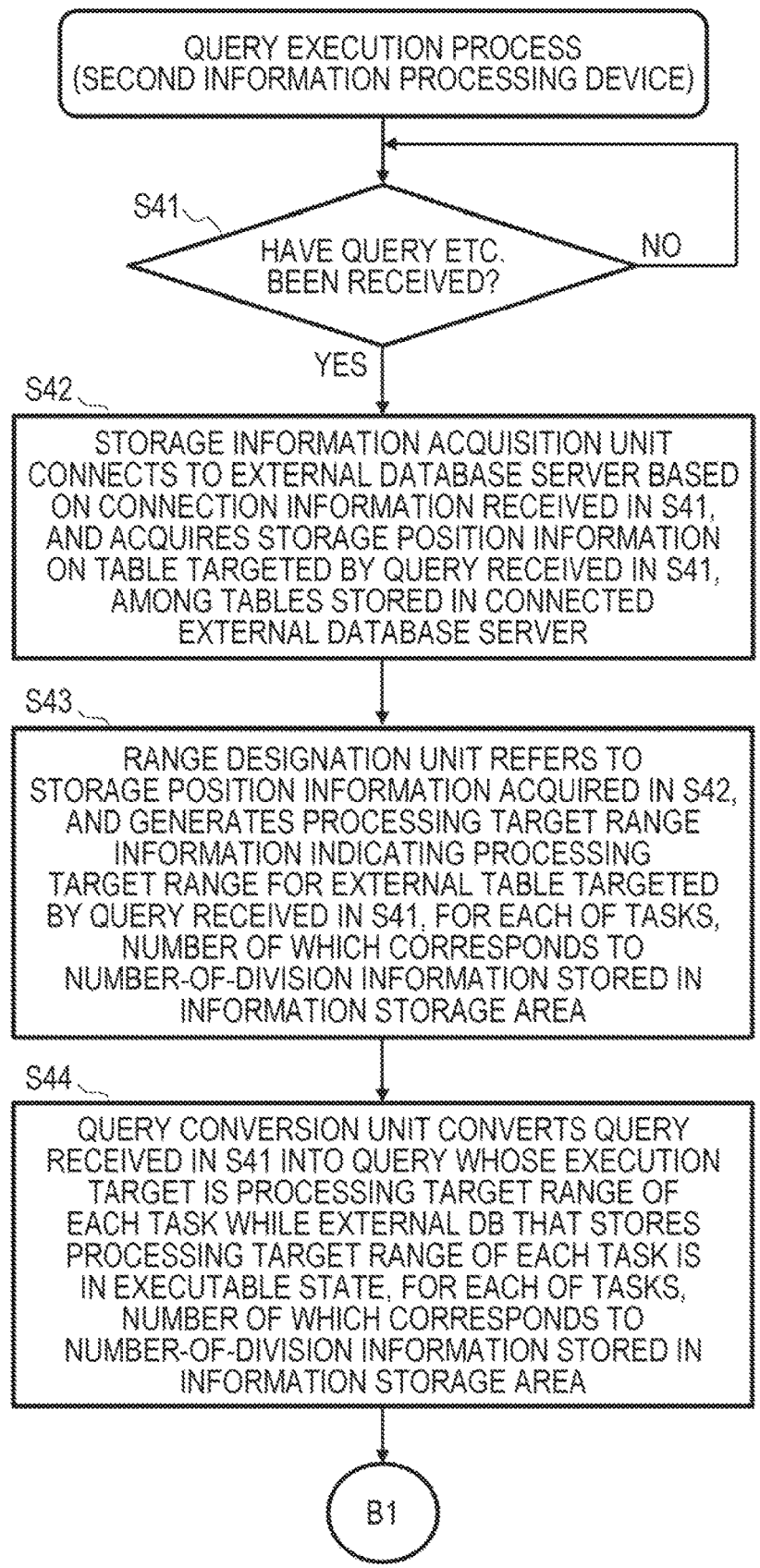
FIG. 14 is a flowchart diagram explaining the details of the query execution process according to the first embodiment.
Figure 15:
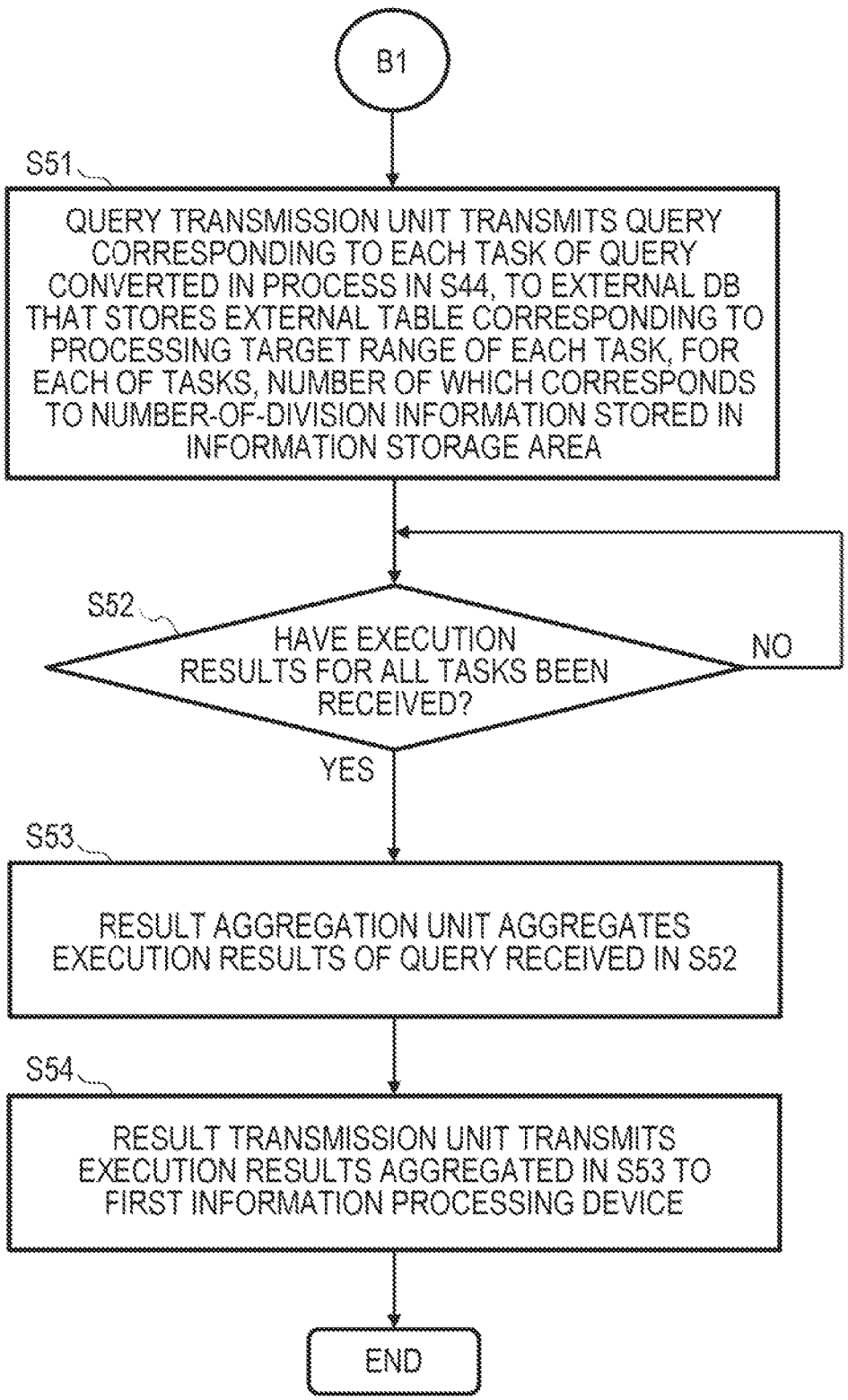
FIG. 15 is a flowchart diagram explaining the details of the query execution process according to the first embodiment.

Next, in the query execution process, a query execution process performed in the information processing device 2 will be described. FIGS. 14 and 15 are diagrams explaining the query execution process performed in the information processing device 2.

As illustrated in FIG. 14, the query reception unit 211 of the information processing device 2 (master server) waits until receiving the first conversion query and the connection information 134 transmitted by the information processing device 1 (NO in S41).

Then, when the first conversion query and the connection information 134 transmitted by the information processing device 1 are received (YES in S41), the storage information acquisition unit 212 of the information processing device 2 (master server) connects to the external DB 3 based on the received connection information 134, and acquires the storage information 231 on the external table TB targeted by the first conversion query received in the process in S41, among the external tables TB stored in the connected external DB 3 (S42). Hereinafter, specific examples of the external table TB and the storage information 231 will be described.

[Specific Example of External Table]

Figures 21, 22:
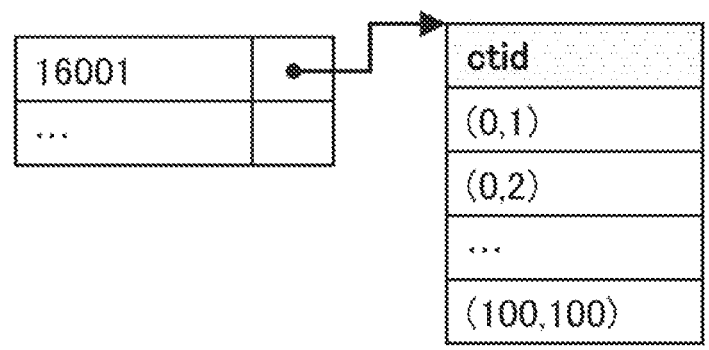
FIG. 21 is a diagram explaining a specific example of an external table TB.
FIG. 22 is a diagram explaining a specific example of storage information 231.

First, a specific example of the external table TB will be described. FIG. 21 is a diagram explaining a specific example of the external table TB.

In the external table TB illustrated in FIG. 21, "100" and "Tokyo" are set in "column A" and "column B" of a record whose "ctid" indicating the storage position of each record has "(0,1)" (the record in the first row), respectively.

Furthermore, in the external table TB illustrated in FIG. 21, "200" and "Osaka" are set in "column A" and "column B" of a record whose "ctid" has "(0,2)" (the record in the second row), respectively. A description for other information included in the external table TB illustrated in FIG. 21 is omitted.

[Specific Example of Storage Information]

Next, a specific example of the storage information 231 will be described. FIG. 22 is a diagram explaining a specific example of the storage information 231.

In the storage information 231 illustrated in FIG. 22, information indicating a record whose "external table ID" has "16001" is associated with information set in "ctid" of the external table TB described with reference to FIG. 21.

Returning to FIG. 14, the range designation unit 213 of the information processing device 2 (master server) refers to the storage information 231 acquired in the process in S42, and generates the processing target range information 233 indicating the processing target range for the external table TB targeted by the first conversion query received in the process in S41, for each of tasks, the number of which corresponds to the number-of-division information 232 stored in the information storage area 130 (S43). For example, the range designation unit 213 designates the processing target range corresponding to each task, by dividing the record included in the external table TB targeted by the first conversion query received in the process in S41 by the number corresponding to the number-of-division information 232.

Note that, when there is a plurality of external tables TB targeted by the first conversion query received in the process in S41, the range designation unit 213 designates the processing target range corresponding to each task, for each of the plurality of external tables TB, by dividing the record included in each external table TB by the number corresponding to the number-of-division information 232. Hereinafter, specific examples of the number-of-division information 232 and the processing target range information 233 will be described.

[Specific Example of Number-of-Division Information]

Figures 23, 24:
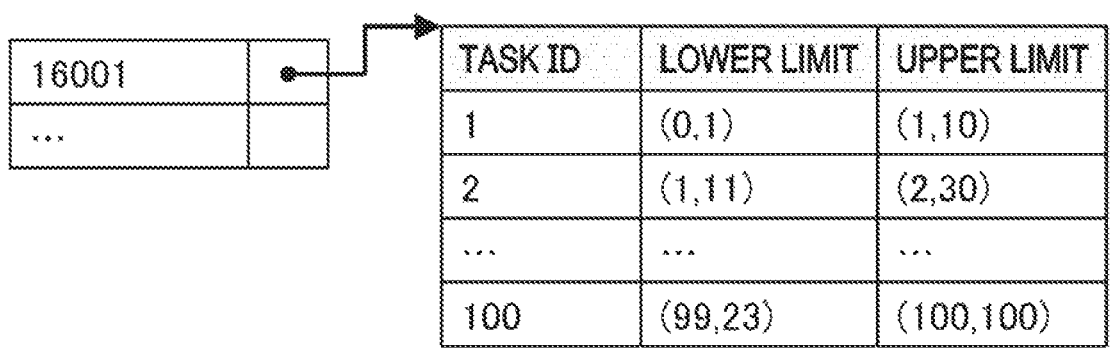
FIG. 23 is a specific example explaining number-of-division information 232.
FIG. 24 is a specific example explaining processing target range information 233.

First, the number-of-division information 232 will be described. FIG. 23 is a specific example explaining the number-of-division information 232.

In the number-of-division information 232 illustrated in FIG. 23, for example, "100", which is a value previously input by the business operator via the business operator terminal 5, is set.

[Specific Example of Processing Target Range Information]

Next, the processing target range information 233 will be described. FIG. 24 is a specific example explaining the processing target range information 233.

In the processing target range information 233 illustrated in FIG. 24, information indicating a record whose "external table ID" has "16001" is associated with information indicating the processing target range corresponding to each task. Then, in the processing target range information 233 illustrated in FIG. 24, the information indicating the processing target range corresponding to each task has, as items, "task ID" that identifies each task, "lower limit" in which the lower limit of the processing target range corresponding to each task is set, and "upper limit" in which the upper limit of the processing target range corresponding to each task is set.

For example, in the processing target range information 233 illustrated in FIG. 24, "(0,1)" is set as "lower limit", and "(1,10)" is set as "upper limit" in information whose "task ID" has "1" (the information in the first row).

Furthermore, in the processing target range information 233 illustrated in FIG. 24, "(1,11)" is set as "lower limit", and "(2,30)" is set as "upper limit" in information whose "task ID" has "2" (the information in the second row). A description for other information included in FIG. 24 is omitted.

For example, the storage order of records stored in the external table TB of the external DB 3 changes according to data update accompanied by the execution of the query. Therefore, when the division for the processing target range of each task is performed using the column as a key, the occurrence of random access in the external DB 3 hinders efficient execution of the query in the information processing device 2. Additionally, such a situation occurs remarkably when the data update accompanied by the execution of the query is performed frequently.

Thus, the information processing device 2 performs the division for the processing target range of each task on the basis of the physical storage position (which is the value set in "ctid") in the external table TB in the external DB 3. For example, the information processing device 2 performs the division for the processing target range of each task, for each record group in which the physical storage positions are consecutive.

With this configuration, the information processing device 2 is allowed to efficiently execute the query regardless of the update status and the like of data stored in the external DB.

Returning to FIG. 14, the query conversion unit 214 of the information processing device 2 (slave server) converts the first conversion query received in the process in S41 into the second conversion query whose execution targets is a record included in the processing target range of each task while the external DB 3 that stores the record included in the processing target range of each task is in an executable state, for each of tasks, the number of which corresponds to the number-of-division information 232 stored in the information storage area 130 (S44).

Then, as illustrated in FIG. 15, the query transmission unit 215 of the information processing device 2 (slave server) transmits a query corresponding to each task of the second conversion query converted in the process in S44, to the external DB 3 that stores the external table TB corresponding to the processing target range of each task, for each of tasks, the number of which corresponds to the number-of-division information 232 stored in the information storage area 130 (S51).

For example, the plurality of slave servers of the information processing device 2 executes the same query (first conversion query) received from the information processing device 1 at multiplicity of plural number. Note that the query execution multiplicity in this case has, for example, the same number as the number of CPU cores included in the plurality of slave servers.

Thereafter, the result reception unit 216 of the information processing device 2 (slave server) waits until receiving the execution results of the second conversion query from all the external DBs 3 to which the second conversion query has been transmitted in the process in S51 (NO in S52).

Then, when the execution results of the second conversion query are received from all the external DBs 3 to which the second conversion query has been transmitted in the process in S51 (YES in S52), the result aggregation unit 217 of the information processing device 2 (master server) aggregates the received execution results of the second conversion query (S53). For example, the result aggregation unit 217 merges, reorganizes, aggregates, and sorts the execution results of the second conversion query.

Thereafter, the result transmission unit 218 of the information processing device 2 (master server) transmits the execution results aggregated in the process in S53 to the information processing device 1 (S54).

[Query Execution Process Performed in External DB]

Figure 16:
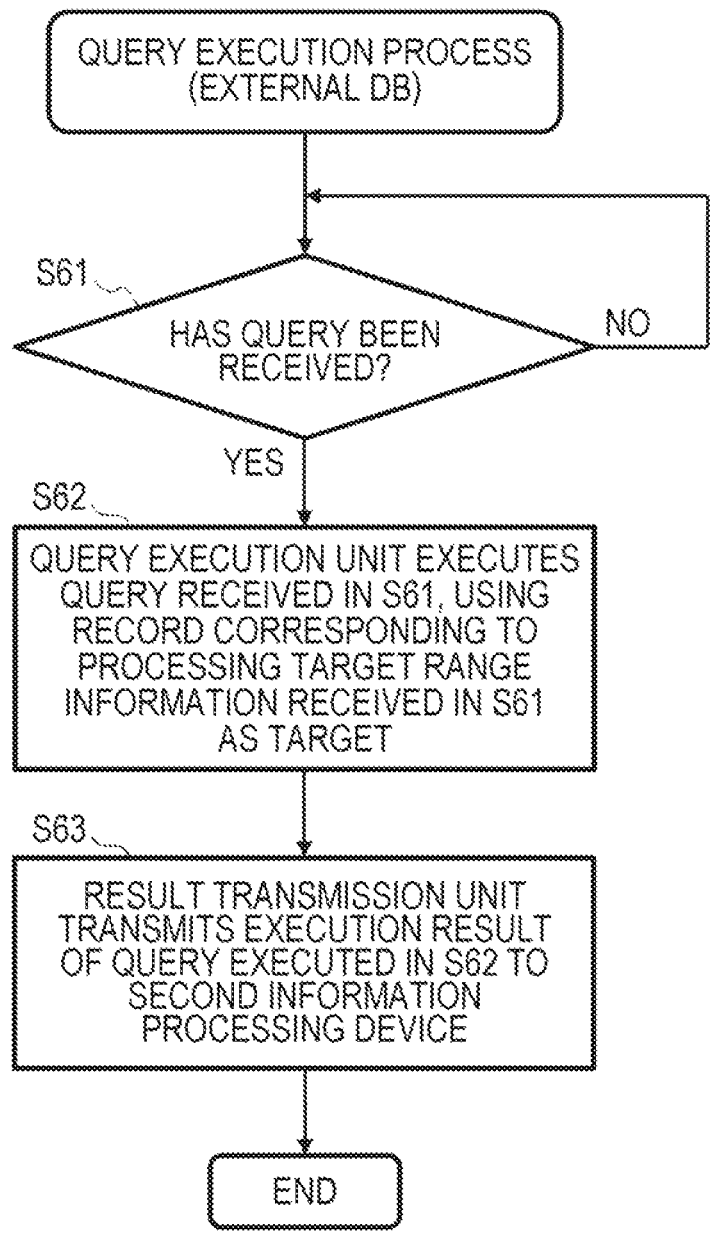
FIG. 16 is a flowchart diagram explaining the details of the query execution process according to the first embodiment.

Next, in the query execution process, a query execution process performed in the external DB 3 will be described. FIG. 16 is a diagram explaining the query execution process performed in the external DB 3.

As illustrated in FIG. 16, the query reception unit 311 of the external DB 3 waits until receiving the second conversion query transmitted by the information processing device 2 (NO in S61).

Then, when the second conversion query transmitted by the information processing device 2 is received (YES in S61), the query execution unit 312 of the external DB 3 executes the second conversion query received in the process in S61 (S62).

Thereafter, the result transmission unit 313 of the external DB 3 transmits the execution result of the second conversion query executed in the process in S62 to the second information processing device 2 (S63).

As described above, for example, when accepting the input of a query input by the user via the user terminal 4, the information processing device 1 in the present embodiment determines whether or not the external DB 3 contains a record targeted by the accepted query. Then, when it is determined that the external DB 3 contains the record targeted by the query, the information processing device 1 specifies the connection information 134 for accessing the determined external DB 3. Thereafter, the information processing device 1 transmits, for example, the query whose input has been accepted and the specified connection information 134 to the information processing device 2.

Meanwhile, when receiving the query and the connection information 134 from the information processing device 1, the information processing device 2 connects to the external DB 3 based on the received connection information, and acquires the storage information 231 on the record targeted by the query, among records stored in the external DB 3. Then, the information processing device 2 generates the processing target range information 233 for each of a plurality of tasks relevant to the record targeted by the received query, based on the acquired storage information 231.

For example, when accepting a query targeting a record stored in the external DB 3, the information processing device 1 offloads the execution of the accepted query to the information processing device 2. Then, the information processing device 2 executes the query offloaded from the information processing device 1 in parallel on the plurality of servers.

With this configuration, the information processing system 10 may be allowed to efficiently execute the query by the information processing device 2. Therefore, the business operator may be allowed to construct a multi-model database capable of efficiently using the external DBs 3.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a first information processing device including a first memory and a first processor coupled to the first memory; and
   a second information processing device including a second memory and a second processor coupled to the second memory, wherein the first processor is configured to:
   accept an input of a query to be processed, determine whether or not an external database server contains records targeted by the query;
   specify connection information for accessing the external database server when the external database server contains the records targeted by the query; and transmit the query and the connection information to the second information processing device, and the second processor is configured to:
   execute the query for each task of a plurality of tasks in parallel, connect to the external database server based on the connection information received from the first information processing device,
   acquire information indicating a storage status of the records targeted by the query among records stored in the external database server,
   determine a processing target range for each task of the plurality of tasks relevant to the records targeted by the query, based on the acquired information indicating the storage status,
   acquire information regarding physical storage positions of the records being targeted by the query, and
   based on the acquired information regarding the physical storage positions and a preset number of task divisions, determine the processing target range of the records targeted by the query for each task of the tasks that correspond to the preset number of task divisions.

2. The information processing system according to claim 1, wherein the second information processing device is a server group constituting a parallel and distributed processing platform, the server group including a plurality of servers executing processes that one-to-one correspond to the plurality of tasks.

3. The information processing system according to claim 1, wherein the second processor determines the processing target range for each task of the tasks corresponding to the number of task divisions such that a plurality of records of which the physical storage positions are consecutive is included in the processing target range of a same task of the tasks.

4. The information processing system according to claim 1, wherein the second processor transmits the query to the external database server storing records that correspond to the processing target range of each task of the tasks, for each task of the tasks that correspond to the number of task divisions.

5. The information processing system according to claim 1, wherein the first processor executes the query using records stored in the first information processing device as targets when the external database server does not contain the records targeted by the query.

6. An information processing apparatus comprising:
   a memory; and a processor couple to the memory and configured to:
   receive from another information processing device a query and connection information for accessing an external database server,
   connect to the external database server based on the connection information, acquire information indicating a storage status of records targeted by the query among records stored in the external database server,
   determine a processing target range for each task of the plurality of tasks relevant to the records targeted by the query, based on the acquired information indicating the storage status,
   acquire information regarding physical storage positions of the records being targeted by the query, and
   based on the acquired information regarding the physical storage positions and a preset number of task divisions, determine the processing target range of the records targeted by the query for each task of the tasks that correspond to the preset number of task divisions.

7. The information processing apparatus according to claim 6, wherein the processor determines the processing target range for each task of the tasks corresponding to the preset number of task divisions such that a plurality of records of which the physical storage positions are consecutive is included in the processing target range of a same task of the tasks.

8. The information processing apparatus according to claim 6, wherein the processor transmits the query to the external database server storing records that correspond to the processing target range of each task of the tasks, for each task of the tasks that correspond to the preset number of task divisions.

9. A non-transitory computer-readable storage medium storing a program that causes a processor included in an information processing apparatus to execute a process, the process comprising:
   accepting a query and a connection information for accessing an external database server;
   connecting to the external database server based on the connection information;
   acquiring information indicating a storage status of records targeted by the query among records stored in the external database server;

determining a processing target range for each task of a plurality of tasks relevant to the records targeted by the query, based on the acquired information indicating the storage status;

acquiring information regarding physical storage positions of the records being targeted by the query; and based on the acquired information regarding the physical storage positions and a preset number of task divisions, determining the processing target range of the records targeted by the query for each task of the tasks that correspond to the preset number of task divisions.

* * * * *